Jan. 29, 1957　　　　L. F. R. FELL　　　　2,779,212
POWER UNITS
Filed Dec. 11, 1953　　　　　　　　　　　8 Sheets-Sheet 1
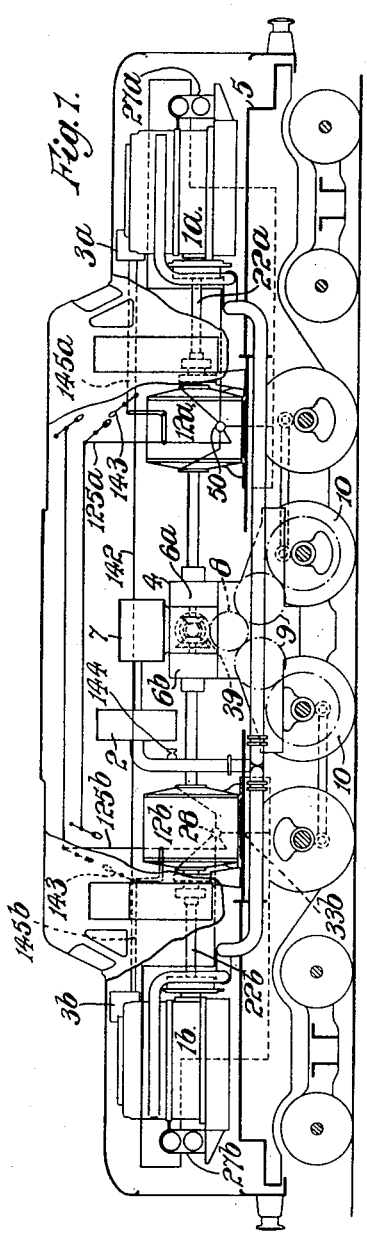
INVENTOR
LOUIS FREDERICK RUDSTON FELL
BY

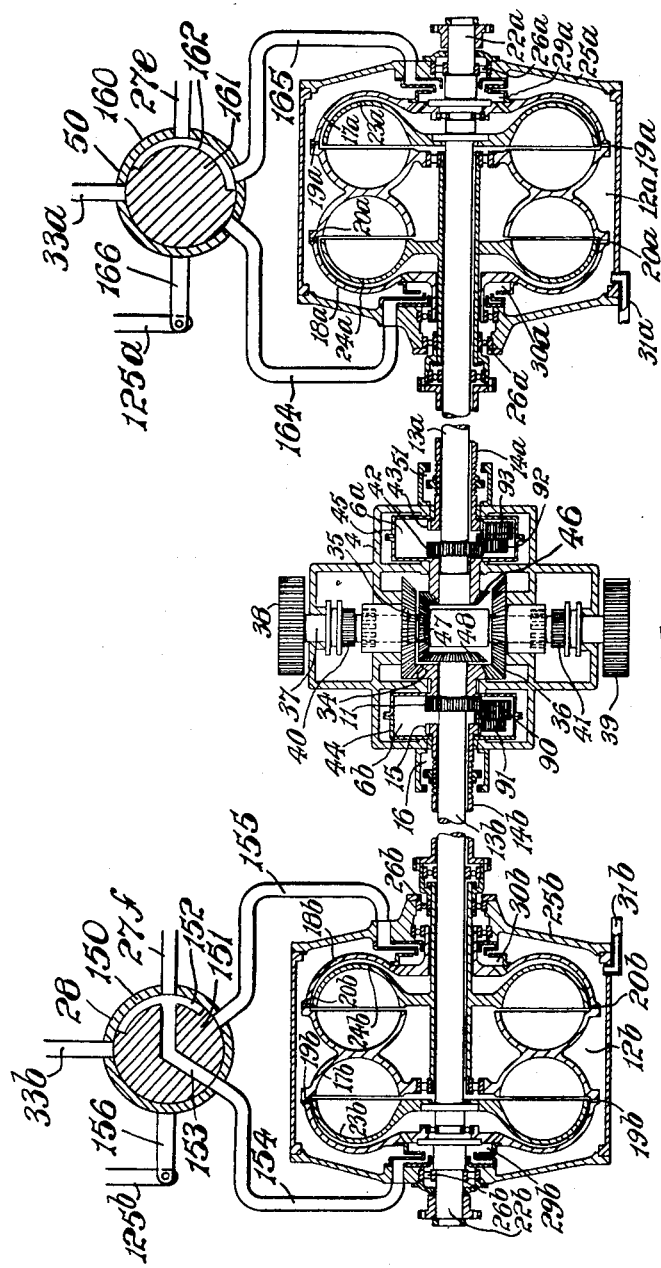

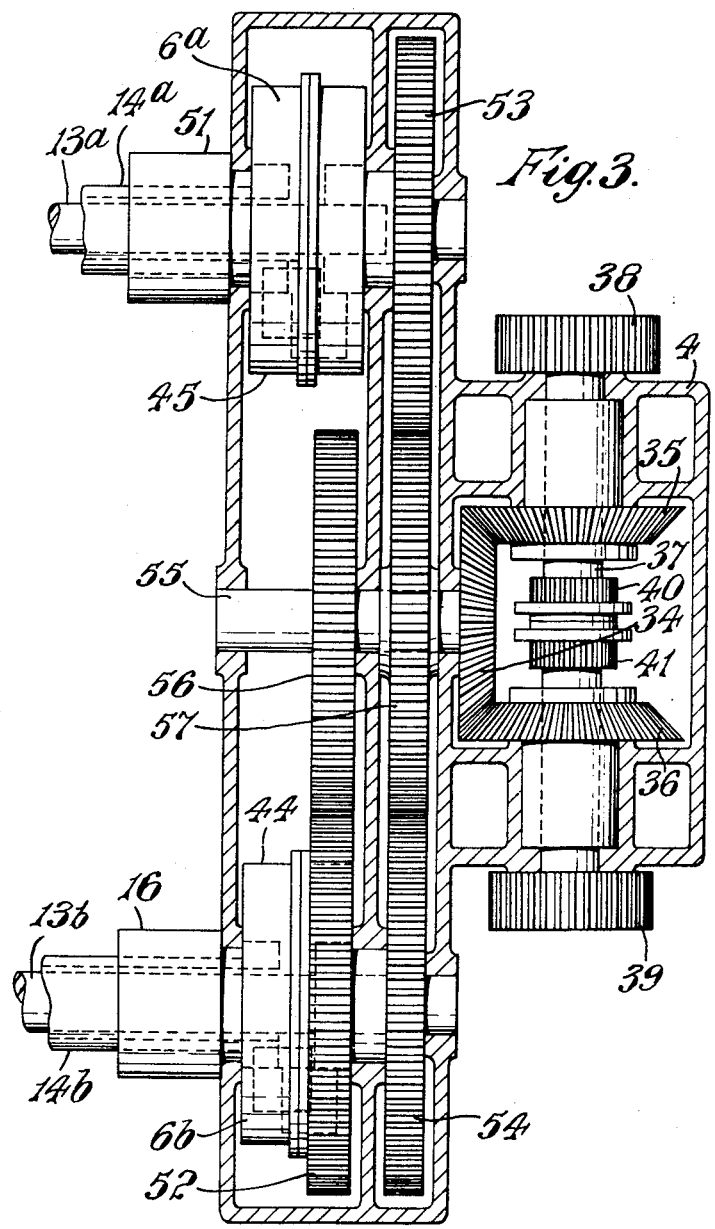

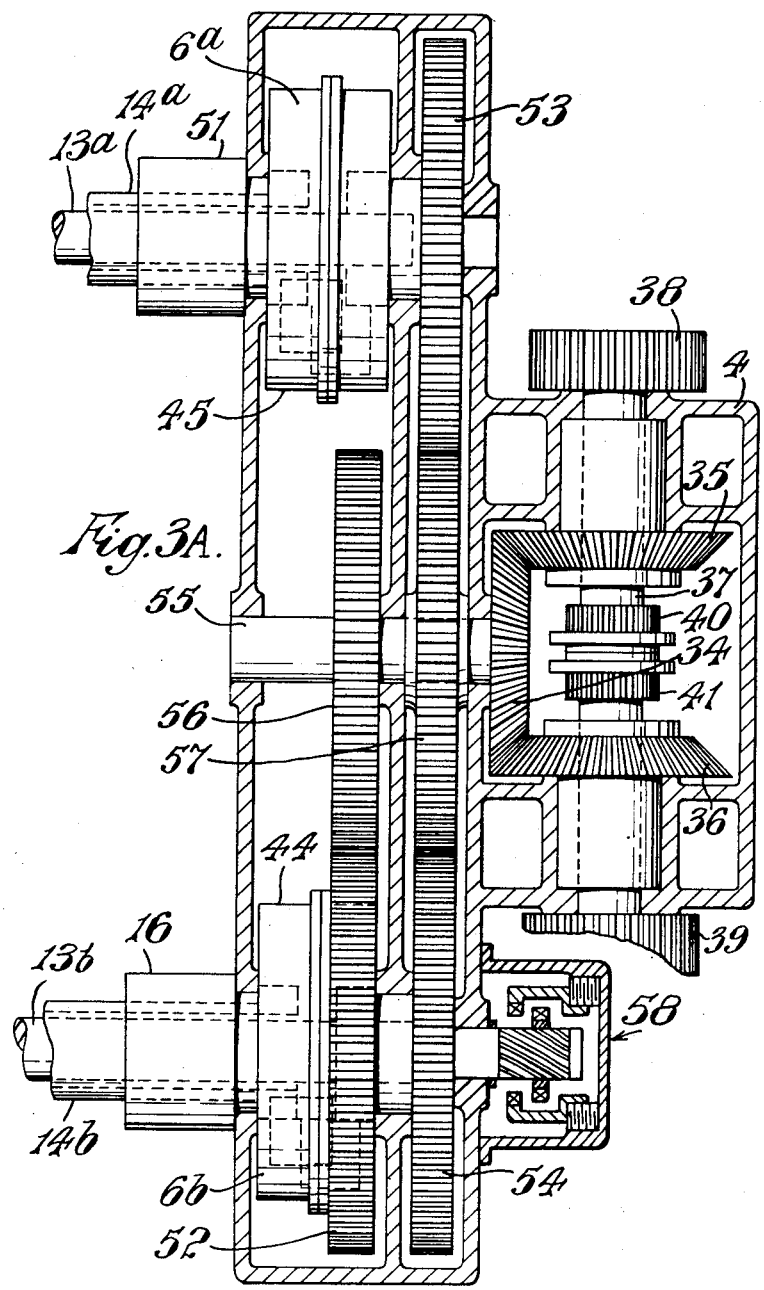

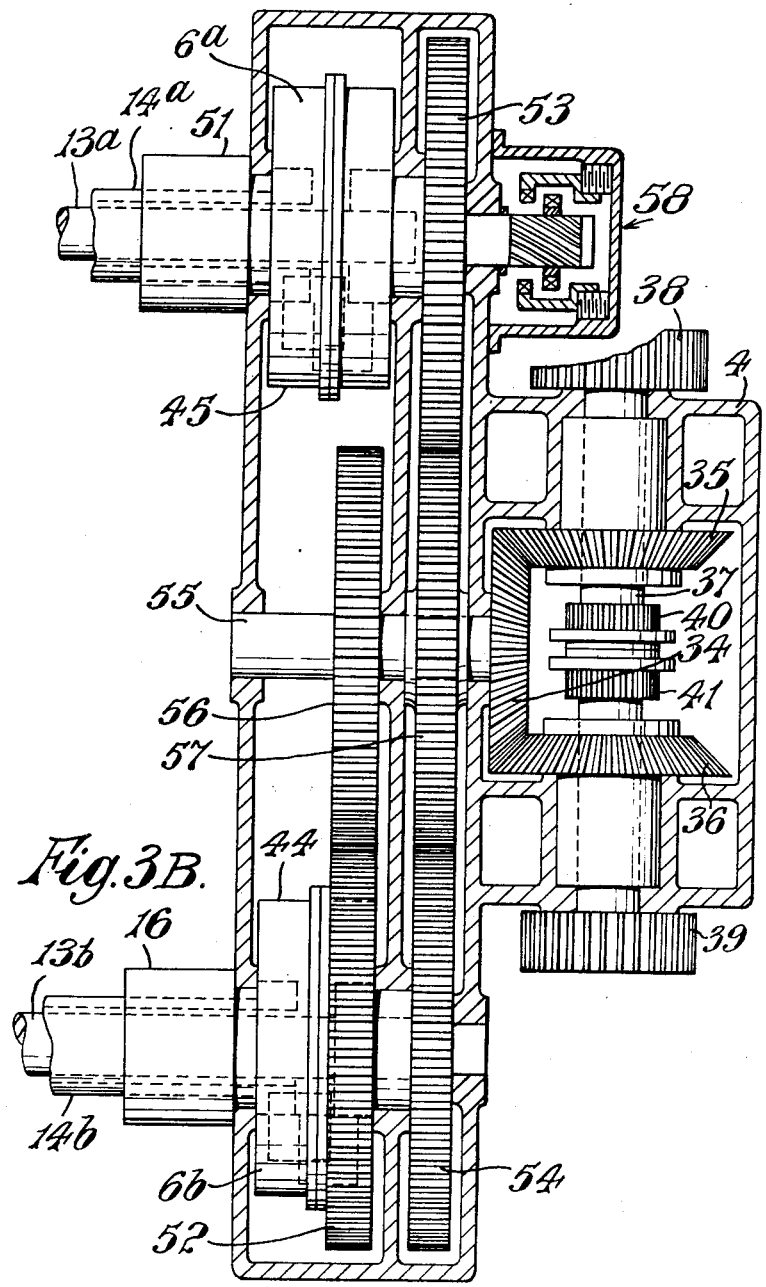

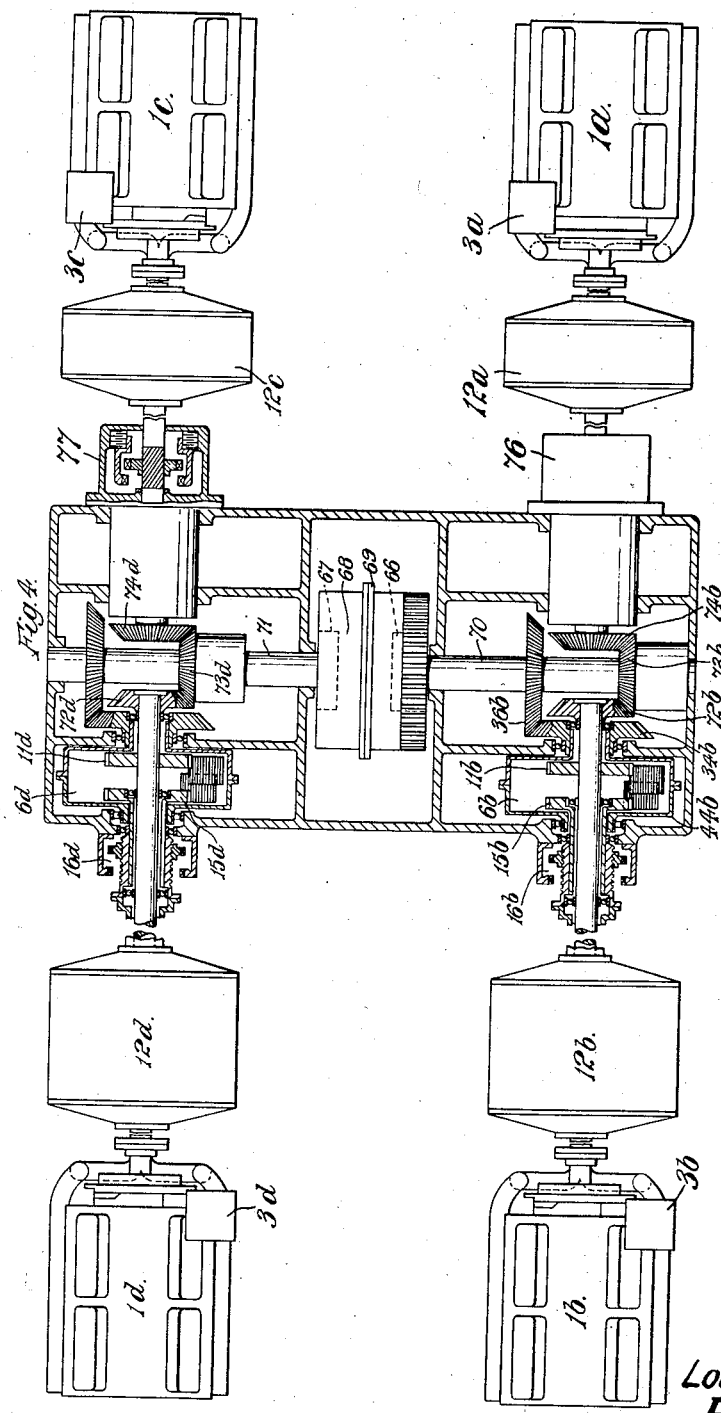

Jan. 29, 1957  L. F. R. FELL  2,779,212
POWER UNITS
Filed Dec. 11, 1953  8 Sheets-Sheet 7
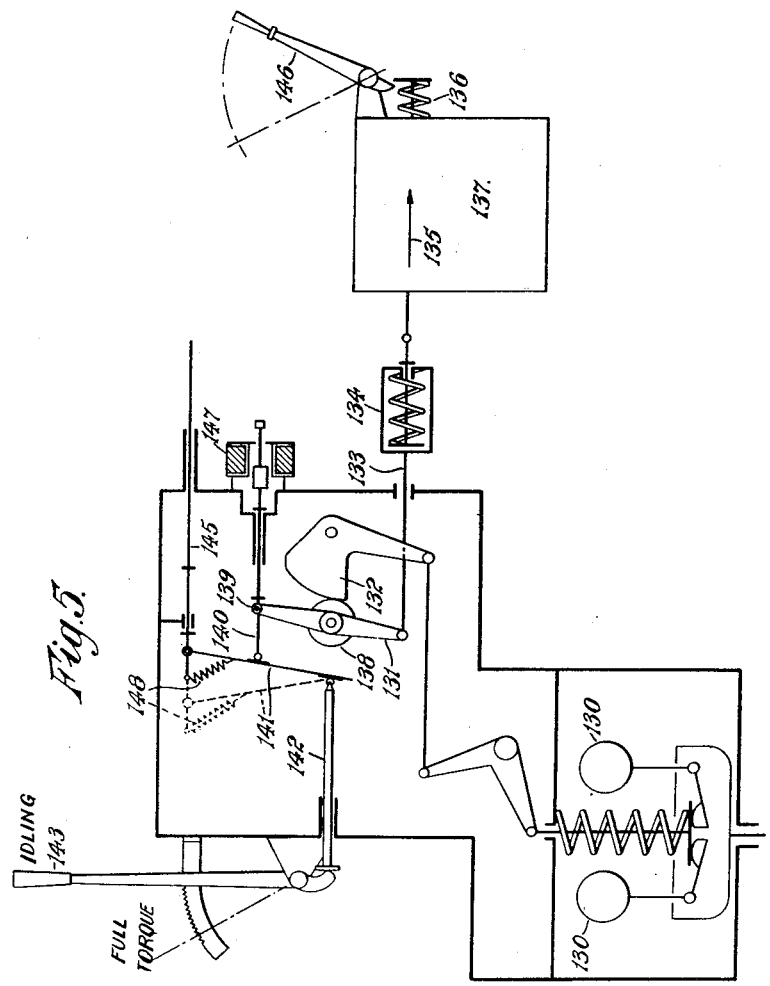
INVENTOR
LOUIS FREDERICK RUDSTON FELL

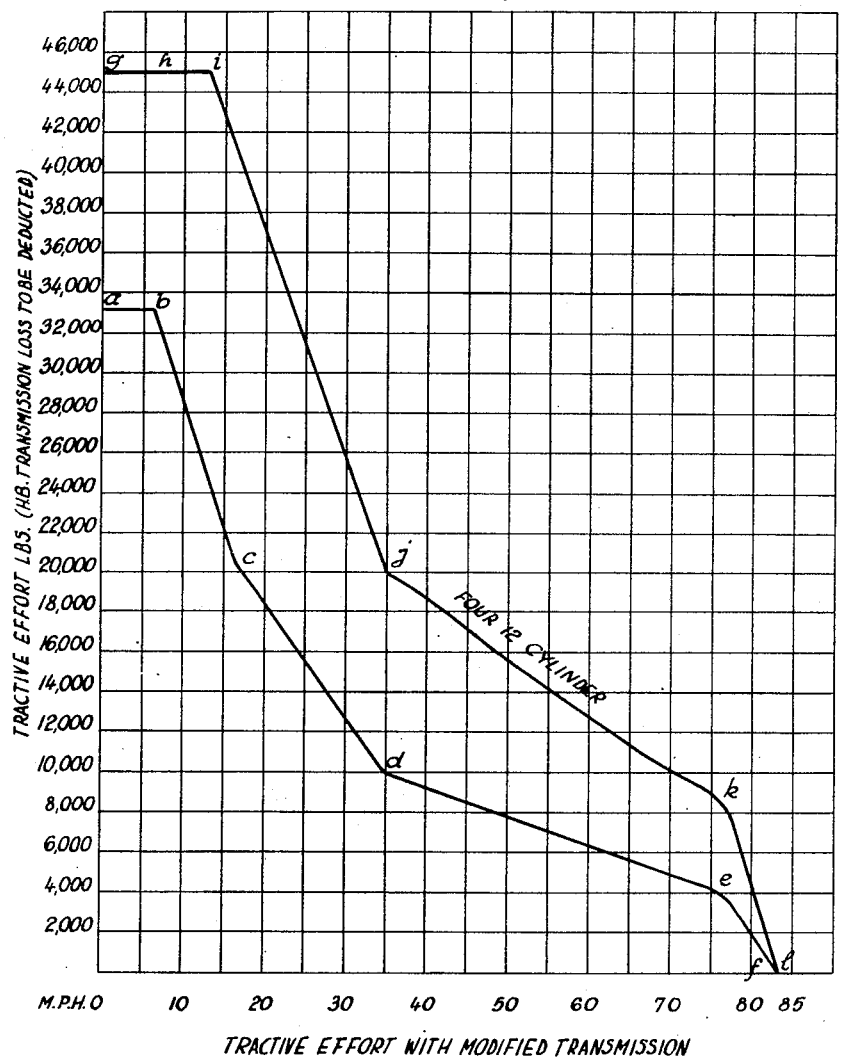

United States Patent Office 2,779,212
Patented Jan. 29, 1957

2,779,212

POWER UNITS

Louis Frederick Rudston Fell, Littleover, England, assignor to Fell Developments Limited, London, England, a British company Application December 11, 1953, Serial No. 397,615

Claims priority, application Great Britain December 19, 1952

12 Claims. (Cl. 74—675)

This invention relates to a power unit which is suitable for driving a mechanism of the kind requiring a driving torque which is at a maximum when starting the mechanism from rest and falls steadily as the speed of the mechanism increases. Examples of this kind of mechanism are self-propelled vehicles for example railway locomotives, and the invention can be used with special advantage for driving such locomotives.

Prime movers are known having an output torque/speed characteristic such that the output torque is zero when the prime mover is at rest, rises to a maximum at the minimum operating speed of the prime mover and thereafter falls steadily as the speed of the prime mover increases. An example of such a prime mover is a compression-ignition internal combustion engine which is supercharged at a pressure which is at its maximum when the engine is at its minimum operating speed, the engine being provided with a governor controlling its fuel injection to give the torque/speed characteristic described. U. S. patent specification No. 2,589,788 described a power unit in which two such engines are connected with the sun wheels of a differential gear through variable filling fluid couplings, the planet carrier of the gear being used to drive a driven mechanism of the kind described, and each sun wheel being associated with a unidirectional device which permits rotation thereof in one direction but not the other. The said specification also describes a power plant comprising two such power units, the planet carrier of each unit being arranged to drive a sun wheel of a further differential gear, the planet carrier of which drives the driven mechanism.

The power unit of the present invention is particularly but not exclusively suited to operate with compression ignition main engines of the type described above in connection with U. S. patent specification No. 2,589,788. It may, however, operate with any prime mover having a falling torque characteristic over the operating speed range such as a suitably governed compression ignition main engine provided with an exhaust-turbine-driven supercharger or a suitably governed normally aspirated compression-ignition engine.

In the following description, the terms "epicyclic gear" and "differential gear" are, in some instances, applied to the same gear and are to be regarded as synonymous. As will appear hereinafter, the gear in question operates in certain circumstances as an epicyclic reduction gear and in other circumstances as a differential gear.

One object of the present invention may be stated as the provision of means whereby, in a power unit of the general type exemplified by the disclosure in patent specification No. 2,589,788, the low speed torque is increased.

Another object is to improve the arrangement of the gearing necessary to combine the output of two or more prime movers in a multiple-engined power unit.

Broadly stated, the present invention consists in increasing the low-speed torque of a power unit of the general type described in U. S. patent specification No. 2,589,788, in which two prime movers are connected by means of a differential gear, by connecting both prime movers to one input gear of the differential gear which then functions as a 2:1 epicyclic reduction gear, and arranging for the drive of one prime mover to be transferred to the other input gear of the differential gear when higher speed and lower torque are required. This is conveniently achieved by connecting one prime mover to the differential gear through a dual type fluid coupling having two impellers and two runners. One runner is connected to each input gear of the differential gear. A switch valve is provided so that one or the other impeller-runner pair may be filled with fluid.

In this way, it is possible to have the full torque of both prime movers applied through a 2:1 reduction gear when starting under load thus giving four times the torque of one prime mover, as compared with twice the torque of one prime mover which is available with two-engined power units of the type described in U. S. patent specification No. 2,589,788.

More specifically stated, a power unit according to the present invention comprises in combination first and second prime movers each having a torque/speed characteristic such that the torque falls steadily over the operating speed range, a primary epicyclic gear train having first and second input gears, planet gears engaging said first and second input gears and a planet carrier, first transmission means including a variable filling fluid coupling or its equivalent for driving the first input gear by the first of said prime movers, second transmission means including a variable filling fluid coupling or its equivalent for driving the first or the second input gear by the second prime mover, a unidirectional device associated with the second input gear to prevent rotation thereof in one direction and means for transmitting power from the planet carrier.

It is generally preferable that both the input gears of the epicyclic train be driven by variable filling fluid couplings (for example pump-filled or scoop-filled couplings), and it will be assumed in what follows, that this is the case, although the invention is not limited thereto. Thus, for example, the gears may be driven by constantly filled fluid couplings, provided that a clutch is interposed between the main engine and the coupling. Alternatively a torque transmitter equivalent to, that is to say having equivalent transmission characteristics to those of, the fluid coupling may be used, for example a magnetic clutch. The term "a variable filling fluid type coupling device" will be employed in the description and claims to denote a variable filling fluid coupling or any other coupling having equivalent transmission characteristics.

The power unit of the present invention may be adapted to give a low-speed torque larger than four times the torque of one prime mover by including torque multiplying means, preferably an epicyclic gear hereinafter referred to as an auxiliary epicyclic gear, in one or both of the first and second transmission means. Such torque multiplying means are preferably provided in the first transmission means.

Both epicyclic gears referred to above are preferably of the planetary type having planet pairs arranged symmetrically about two coaxial sun wheels or input gears.

By arranging the fluid couplings and the first and second input gears of the primary epicyclic gear (and of the auxiliary epicyclic gear whom employed) on a common axis, and by transmitting power from the planet carrier by means of a bevel gear train, certain gears of which are mounted on an axis at right angles to, and in the same plane as, the said common axis, the epicyclic gear or gears and the gearing transmitting drive from the primary epicyclic gear planet carrier to the gear train taking the load driven by the power unit, may be arranged in a single gear box, in a compact yet accessible manner. It is also possible by this arrangement to avoid to a large extent superimposed gear trains; hence the risk of breakage in one gear causing damage in gears situated at a lower level is obviated or greatly minimised.

Two power units of the present invention may be arranged to give a power unit with four prime movers in which the two primary epicyclic gears drive a secondary differential or epicyclic gear as shown, for example, in Figure 1 of U. S. patent specification No. 2,589,788. With such an arrangement, it is possible to supply the torque of two prime movers with a 4:1 torque multiplication.

The invention is further illustrated by the preferred embodiments thereof shown in the accompanying drawings, in which Figure 1 is a diagrammatic side elevation of a railway locomotive incorporating a two-engined power unit.

Figure 2 is a plane view, partly in section and on a larger scale, of the fluid couplings and gear box shown in Figure 1 with certain features shown diagrammatically.

Figures 3, 3A and 3B are plan views of modified gear boxes.

Figure 4 is a plan view of a modified gear box arranged to receive the drive from four prime movers.

Figure 5 is a diagrammatic representation of one of the governors used in the prime movers.

Figure 6 is a graph showing the tractive effort-speed characteristics of the power units of the preceding figures.

Turning now to Figures 1 and 2, the power unit comprises, as prime movers, two main compression-ignition internal combustion engines 1a, 1b which are supercharged, for example by a blower 2 which is driven independently of the main engines by an auxiliary engine 7, at a pressure which falls steadily from its value at a predetermined low engine speed (for example 450 R. P. M.) as the engine speed increases. The engines 1a, 1b are provided with governors 3a and 3b respectively which regulate the fuel supplied to the engines in accordance with the supercharger pressure so that the torque-speed curve falls from a maximum at the said low speed as the engine speed increases. The drive from the engines 1a and 1b passes through output shafts 22a and 22b and fluid couplings 12a and 12b respectively to a gear box 4 and thence by gears 8 and 9 to two track wheels 10 on each side of the locomotive.

For normal track requirements, the locomotive requires a main engine with a torque range of approximately 3:1 over its running speed range in order to attain a maximum speed of the order of 70–80 M. P. H. An engine as described above, when driving the locomotive at a constant speed ratio, however, can only give a torque range of this order over about a quarter the speed range of the locomotive. In order to enable the two engines to drive the locomotive over its full speed range they are combined in a power unit according to the invention.

As shown in Figure 1, the two main compression ignition internal combustion engines 1a and 1b of the power unit are arranged one on each side of the gear-box 4 which is situated centrally of the locomotive chassis 5. This gear box 4 as shown in Figure 2 houses or supports a primary epicyclic gear 6b and an auxiliary epicyclic gear 6a, a gear train 34, 35, 36, 38, 39 for transmitting drive from the planet carrier 44 of the primary epicyclic gear 6b to the gears 8, and a forward-reverse gear described in detail below. The second main engine 1b drives the input gears 11 and 15 of the primary epicyclic gear 6b through a dual type variable filling fluid coupling 12b from which the two output drives are carried by an output shaft 13b and a coaxial sleeve 14b surrounding the shaft. The sleeve 14b drives the second input gear 15 of the primary epicyclic gear and the output shaft 13b drives the first input gear 11 of the primary epicyclic gear 6b. The input gears 11 and 15 are connected by means of a number of planetary pairs 90, 91 which are arranged symmetrically about, and have their axes parallel to, the axis of the epicyclic gear 6b, but of which number, only one pair is shown for the sake of clarity. Planet wheel 90 engages with input gear 11 and planet gear 91, which latter gear also engages with input gear 15. Gears of this type are described more fully in the publication "Engineer," issue No. 4783, 1947, page 285.

A unidirectional device 16 is provided to prevent rotation in one direction of the second input gear 15. The unidirectional device 16 is of the type wherein a movable dog-clutch member is mounted on helical splines on a sleeve carrying the gear 15 and cooperates with a fixed dog clutch member carried by the gear box 4. Relative movement between the movable dog clutch member and the gear 15 combined with the action of the helical splines causes engagement or disengagement of the dog clutch. A unidirectional device of this type is described in more detail in U. S. patent specification No. 2,610,526.

The drive from the planet carrier of the primary epicyclic gear 6b is taken from a bevel gear 34 fixed to the planet carrier and engaging two further bevel gears 35 and 36 mounted freely on a cross-shaft 37 having its axis at right angles to, and coplanar with, the common axis of the input gears 11 and 15. This shaft 37 projects through the sides of the gear box 4 and has secured, one at each end, final gears 38 and 39 which drive the locomotive track wheels 10 through gears 8 and 9. Two dog clutches 40 and 41 are provided, one for each of the further bevel wheels 35 and 36, whereby one or other of these wheels may be locked to the cross shaft 37. Since these further bevel wheels 35 and 36 rotate in opposite directions, forward-reverse gear control is obtained by engaging one or other of the dog clutches 40 and 41.

The dual type fluid coupling 12b is of a known type and comprises two impellers 17b, 18b having oil-bleeds 19b and 20b respectively and which are fixed together and to the shaft 22b driven by the main engine 1b, runners 23b and 24b cooperating with impellers 17b and 18b respectively, runner 23b being fixed to the output shaft 13b and the runner 24b being fixed to the coaxial sleeve 14b surrounding the output shaft 13b, and a fixed casing 25b surrounding the two impeller runner-pairs and having bearings 26b for the shaft 22b and the sleeve 14b. An oil pump 27b (Figure 1) driven by the main engine 1b supplies oil through a feed pipe 27f to the fluid coupling 12b in accordance with the setting of a valve 28, described below, which causes the pump 27b to fill one or other of the runner-impeller pairs 17b, 23b and 18b, 24b. As may be seen from Figure 2, the pump output is fed to one of two collecting rings 29b and 30b coaxial with, and arranged to feed, the impellers 17b and 18b respectively. There are also provided a return conduit 31b to lead back to the pump inlet any oil bleeding from an impeller-runner pair into the fixed casing 25b of the coupling, and a by-pass conduit 33b, leading oil back to the inlet of the pump 27b when neither impeller-runner pair is filled. As soon as oil ceases to be supplied to a given impeller-runner pair, this pair will rapidly empty, as a result of oil being forced out through the bleed-off 19b or 20b under centrifugal force, and so destroy the driving connection between the impeller and the runner.

The valve 28, shown diagrammatically in Figure 2 as being of the barrel type comprises a casing 150 in which fits tightly a barrel member 151. The casing 150 has orifices whereby pipes 27f, 154 and 155 and conduit 33b may communicate with its interior. The barrel member 151 has an arcuate channel 152 over part of its circumference and an internal conduit 153 communicating therewith; it also has an arm 156 which is pivotally connected to a control rod 125b. The pipes 154 and 155 communicate with collecting rings 29b and 30b respectively. It will be appreciated from Figure 2 that by turning the barrel member 151, the pipe 27f may be made to communicate with pipe 154 or 155 or with conduit 33b.

The auxiliary epicyclic gear 6a is mounted on the opposite side of the cross shaft 37 to the primary epicyclic gear 6b and, as indicated above as being preferable, is coaxial therewith. The auxiliary gear 6a is identical to the primary epicyclic gear 6b and has a first input gear 42, a second input gear 43, a planet carrier 45 and a unidirectional device 51 acting on input gear 43. A pair of planetary gears 92, 93 is shown. A bevel gear 46 mounted on the planet carrier 45 is, however, of slightly smaller diameter than the bevel gear 34. This bevel gear 46 engages with an intermediate bevel gear 47 mounted freely on the cross shaft 37 between the two further bevel gears 35 and 36 and engaging in turn a bevel gear 48 which is fixed to the first input gear 11 of the primary epicyclic gear 6b.

The auxiliary epicyclic gear 6a is driven from the first main engine 1a in the same way as the primary epicyclic gear 6b is driven from the second main engine 1b, by a dual type fluid coupling 12a which is identical with the coupling 12b and corresponding components bear the same reference numerals as in the case of coupling 12b, but with the suffix a in each case instead of b. Further description of the coupling 12a is therefore unnecessary. Coupling 12a is controlled by a valve 50 which differs from the valve 28 in that it permits one or both impeller-runner pairs 17a, 23a and 18a, 24a to receive via a feed pipe 27e oil from a pump 27a driven by engine 1a and so to be in operation at the same time.

The valve 50 shown diagrammatically in Figure 2 as being of the barrel type, comprises a casing 160 in which fits tightly a barrel member 161. The casing 160 has orifices whereby pipes 27e, 164 and 165 and by-pass conduit 33a may communicate with its interior. The barrel member 161 has an arcuate channel 162 over a part of its circumference; it also has an arm 166 which is pivotally connected to a control rod 125a. The pipes 164 and 165 communicate with collecting rings 29a and 30a respectively. It will be appreciated from Figure 2 that by turning the barrel member 161, the pipe 27e may be made to communicate with pipe 165, or pipes 164 and 165 together or with conduit 33a.

The main engine governors 3a and 3b are identical and therefore only one is shown in Figure 5. Such a governor is fully described in U. S. patent specification No. 2,600,983 and will not be described herein in further detail than is necessary for an understanding of the power plant now being described. The governor shown in Figure 5 comprises flyweights 130 which actuate a lever 131 by way of the linkage shown and a cam 132. The lower end of the lever 131 is pivoted to a rod 133 which is connected with the fuel control rack of the fuel injection pump 137 through an extensible link 134. Movement of the rod 133 in the direction of the arrow 135 has the effect of reducing the fuel injection to the engine, and the rod is urged in this direction by a spring 136. The lever 131 is provided at its centre with a cam roller 138 and is pivoted at 139 to a rod 140 the other end of which abuts against a lever 141. The latter is pivoted at its upper end to a rod 145, and at its lower end abuts against a rod 142 the other end of which is actuated by a regulator lever 143 in the cab of the locomotive. The lever 143 is common to both the main engine governors, that is to say it is arranged to actuate simultaneously the rods 142 of both governors. Two levers 143 acting on a common rod 142 are shown in Figure 1 since each driving cab has a complete set of controls.

The end of the rod 145 remote from the lever 141 is linked to the rod 125a or 125b which controls the valve of the fluid coupling 12a or 12b driven by the main engine the governor of which is being described, the arrangement being such that when the coupling is emptied, the rod 145 moves to the left from the position shown in Figure 5, sufficiently far to restrict the fuel injection of that main engine to the idling charge. When, however, any impeller-runner pair of the coupling is filled, the rod 145 moves to the position shown in Figure 5 at which it no longer restricts the fuel injection. It will be noted that hand levers and connecting rods are provided so that both rods 125a and 125b can be operated from each driving cab. It will be understood that while the interlock between the lever 141 and the appropriate coupling control valve is shown for simplicity as being mechanical, other means may be used for example the vacuum connection shown in U. S. patent specification No. 2,600,983. The governor is provided with a solenoid 147 which is energised with a starting motor of the engine so as to pull the lever 131 in a clockwise direction to increase the fuel injection to the value required for starting. Each governor is further provided with a stopping lever 146 which, with the aid of the link 134, can be used to stop the engine regardless of the position of the lever 131.

The auxiliary engine 7 (Figure 1) is provided with a governor of known kind (not shown) which governs the engine to a constant speed. This speed is so selected that the blower 2 can deliver air to the main engines at a maximum supercharging pressure until, but only until, the speed of these engines reaches a predetermined value. At main engine speeds higher than that value, the supercharging pressure falls steadily, while at speeds lower than that value the supercharging pressure is maintained constant by means of a blow-off valve 144. The profile of the cam 132 is such that, with the supercharging arrangements as stated, the torque of the main engine is at a maximum at the minimum operating speed of the engine, for example 200 R. P. M. and thereafter falls steadily as its speed increases. The governor thus serves to keep the torque of the engine on a predetermined torque/speed curve. The function of the regulator 143 is to shift the fulcrum 139 of the lever 131 so as to control the zero setting of the governor and hence the line of zero torque with respect to which the torque/speed curve is to be regarded as plotted. This control is effected by the lever 143 simultaneously for both main engines.

The operation of the power unit just described is as follows: the first main engine 1a is started and the control valve 50 is set at the position shown in Figure 2 to fill the impeller-runner pair 17a, 23a via channel 162 and pipe 165 which causes the first input gear 42 of the auxiliary epicyclic gear 6a to turn. Since the second input gear 43 is prevented from rotation in a direction opposite to that of the first input gear by means of the associated unidirectional device 51, the planet carrier 45 turns in the same direction as the first input gear 42 at one-half the speed, and with twice the torque of the first main engine 1a. This drive is transmitted via the intermediate bevel gear 46 to the first input gear 11 of the primary epicyclic gear 6b, the second input gear 15 of which is prevented from rotation in a direction opposite to that of the first input gear 11 by means of the associated unidirectional device 16. Therefore, the planet carrier 44 of the primary epicyclic gear 6b rotates in the same direction as the first input gear 11 at one-half the speed and twice the torque. The device is transmitted to the locomotive track wheels, through the appropriate bevel gear 35 or 36 and the dog clutch 40 or 41. There is thus provided a fourfold torque multiplication of the first main engine output torque.

Increased torque for starting purposes may be provided by starting the second main engine 1b and by setting the valve 28 at the position shown in Figure 2 to fill that impeller-runner pair 17b, 23b of the dual type fluid coupling 12b via channel 152, conduit 153 and pipe 154, which causes the second main engine 1b also to drive the first input gear 11 of the primary epicyclic gear 6b. The result of this is to cause the primary epicyclic gear 6b to double the torque of the second main engine 1b and this is added to the fourfold torque of the first main engine 1a.

When starting with two engines in this manner, the output torque from the power unit is maintained substantially constant until a speed of about 6 M. P. H. is reached, owing to the combined effect of the engine governors and the slip occurring in the fluid couplings; this is represented by the part a—b of the curve abcdef of Figure 6. As the speed increases beyond 6 M. P. H., the torque falls until, at 17 M. P. H., it is about 60% of its initial value, point C of the curve, and at this speed the barrel member 161 of valve 50 is turned clockwise until channel 162 communicates with pipe 164 as well as pipe 165 and the runner-impeller pair 18a, 24a of the dual type fluid coupling 12a is filled, thereby driving the second input gear 43 of the auxiliary epicyclic gear 6a. This causes the input gears 42 and 43 and planet carrier 45 of the auxiliary epicyclic gear 6a to revolve at substantially the same speed, namely the speed of the first main engine 1a. The first main engine 1a, as well as the second main engine 1b, then drive the locomotive at half speed and twice the sum of their torques by reason of the reducing gear action of the primary epicyclic gear 6b.

Under these conditions, represented by c—d in Figure 6, the torque falls less rapidly than formerly and decreases, at 35 M. P. H., to about 34% of its initial value. At this speed, by clockwise rotation of the valve 28, the pipe 154 is disconnected from the pipe 27f which is then put into communication with pipe 155 and the dual type fluid coupling 12b is set to drive the second input gear 15 of the primary epicyclic gear 6b and is operatively disconnected from the input gear 11. The primary epicyclic gear 1b then has each input gear driven by one of the main engines at engine speed and acts as a differential gear which combines the power outputs of both main engines 1a and 1b while allowing minor variations of individual engine speed to take place with no tendency for the slower engine to load the faster engine. The speed of the planet carrier 44 of the primary epicyclic gear is then the mean speed of the two main engines and the torque transmitted to the locomotive track wheels is the sum of the main engine torques.

With this adjustment the decrease of torque with increase of speed is again lessened and the torque falls uniformly until, at 75 M. P. H., it is about 12% of its initial value. This is represented by the portion d—e of the curve abcdef.

When starting the two-engined power unit described above, the procedure will generally be to start both main engines 1a and 1b before either of them is connected to the primary epicyclic gear 6b; thereafter each main engine may be controlled by a combination of a centrifugal governor and a manual control, for example as described in Patent No. 2,600,983.

It will be appreciated that a necessary condition for stable operation in this manner is for the two main engines each to have a torque/speed characteristic such that the torque decreases smoothly over the operating speed range. Any tendency of the faster running engine to decrease the speed of the slower running engine is checked by the tendency of the torque of the slower running engine to become larger than that of the faster running engine. The torque characteristic described therefore exercises an effect tending to bring the engines into synchronism.

The power unit described above may be modified to receive drive from two main engines situated on the same side of the gear box. This arrangement is often preferable for use in smaller locomotives such as may be used for shunting purposes, since it enables the overall length of the locomotive to be considerably reduced compared with a locomotive having a power unit arranged as described above.

In this modified arrangement, which is shown in Figure 3, wherein the same references are used for the same parts as in Figures 1 and 2, the primary epicyclic gear 6b and the auxiliary epicyclic gear 6a are arranged with their axes parallel, and both on the same side of the gear box 4. The planet carriers 44, 45 of these gears are fixed in relation to gear wheels 52 and 53 respectively, and both gear wheels are of the same size. A similar gear wheel 54 is fixed in relation to the first input gear 15 of the primary epicyclic gear 6b. An intermediate shaft 55 having its axis parallel to, and coplanar with, the axis of the two epicyclic gears 6a and 6b is arranged mid-way between them and carries two further gear wheels 56 and 57. Gear wheel 57 is mounted freely on the intermediate shaft 55 and serves as an idler which engages with the gears 53 and 54. The gear wheel 56 on the intermediate shaft 55 is fixed thereto and engages with the gear wheel 52. A bevel gear 34 is also fixed in relation to the intermediate shaft 55 and engages the two further bevel gears 35 and 36 on the cross shaft 37. The two further bevel gears 35 and 36 are arranged to drive the cross shaft 37 by means of dog clutches 40 and 41 as described above. The axis of the cross shaft 37 is coplanar with the axis of the intermediate shaft 55 and the two epicyclic gears 6a and 6b. This modified arrangement functions in the same way as the power unit described in connection with Figures 1 and 2.

In the power units described above, it is desirable that the arrangement should be such that power can be transmitted to the final gears 38, 39 if either the first or second main engine fails. With the arrangements described above, this requirement is met when starting up, since both engines then drive the first input gear of the primary epicyclic gear, and the failure of either main engine only increases the load on the other main engine. If the second main engine 1b fails during full-speed running, the first main engine 1a can still drive the unit since the second main engine, coupled only to the second input gear 15 of the primary epicyclic gear 6b, will be prevented from reverse turning by the unidirectional device 16, and the power of the first main engine will not be lost by reverse turning of this second main engine. If, during full-speed running, the first main engine fails, drive can be maintained by transmitting the power of the second main engine to the first input gear 11 of the primary epicyclic gear (as when starting) and by emptying the fluid coupling 12a associated with the first main engine 1a, by turning valve 50 to put pipe 27e into communication with by-pass conduit 33a. This will, however, cause some interruption in the drive while the appropriate impeller-runner pair of the fluid coupling 12b is being filled, during which time the first input gear 11 will rotate, or tend to rotate, backwards. Since it is desirable to prevent reverse rotation of the first input gear 11, there may be added an additional unidirectional device for this purpose. This additional unidirectional device may act directly on this first input gear 11, or any element geared thereto, preferably the planet carrier of the auxiliary epicyclic gear 6a.

Figures 3A and 3B show diagrammatically modified arrangements based on Figure 3 and showing an additional unidirectional device 58 which is arranged to prevent reverse rotation of gear 11 either by acting directly on a spindle secured thereto as in Figure 3A or on a spindle secured to the planet carrier 45 as in Figure 3B. When both input gears 15 and 11 have unidirectional devices associated with them, one of these devices should be of the releasable type described in U. S. Patent specification No. 2,610,526, and the unidirectional device 58 of Figures 3A and 3B is shown as being of this type.

The same effect is achieved if the additional unidirectional device acts upon the first input gear 42 of the auxiliary epicyclic gear 6a, since it then cooperates with the unidirectional device 51 (both unidirectional devices acting in the same sense) to prevent reverse rotation of the planet carrier 45. This latter arrangement of the additional unidirectional device is more conveniently applied to the unit having the main engines on the same side of the gear box, as shown in Figure 3, since the first input gear 42, or its spindle, can easily be extended through the planet carrier 45 to accommodate the additional unidirectional device. Here again one unidirectional device should be of the releasable type.

When there is no auxiliary epicyclic gear, one unidirectional device, which may be regarded as the additional unidirectional device referred to above, is required to prevent reverse rotation of the first input gear 11 of the primary epicyclic gear 6b, and may be arranged anywhere on the transmission of the first main engine 1a, between the fluid coupling 12a and this first input gear 42 of the primary epicyclic gear 6b.

An alternative way of maintaining drive during full-speed running, if the first main engine fails, is to replace valve 28 by a valve such as valve 50 so that, in the fluid coupling 12b, both impeller-runner pairs can be filled at the same time. If the first main engine 1a fails, the second main engine 1b is then made to drive both input gears 11 and 15 by filling the impeller-runner pair 17b, 23b. It is, however, still desirable to have an additional unidirectional device as indicated above to prevent reverse rotation of the first input gear 11 and thus to obviate an interruption in the drive.

A further modification shown in Figure 4 is to arrange two power units of the present invention to give a four-engined power unit. Thus in Figure 4, four main engines 1a, 1b, 1c and 1d are combined with four fluid couplings 12a, 12b, 12c and 12d respectively and with primary epicyclic gears 6b and 6d as shown, which drive input gears 66 and 67 of a secondary epicyclic gear 68 from the planet carrier 69 of which the combined drive of all four engines may be taken. The secondary epicyclic gear 68 is of the same construction as the primary epicyclic gear 6b described above. This modified arrangement may be regarded as two of the two-engined power units described in connection with Figures 1 and 2, arranged side by side with the axes of the primary epicyclic gears in each unit parallel to each other and therefore does not require description of all details. Components having the same function as in Figure 2 have the same reference numerals with added or different suffix letters where appropriate. The cross shafts 70 and 71 of these two power units, corresponding to shaft 37 of Figure 2, are arranged coaxially to each other and carry at their ends input gears 66 and 67 respectively of the secondary epicyclic gear 68. Engine 1a drives the input gear 11b of gear 6b through a bevel gear train 72b, 73b, 74b. Bevel gear 72b is fixed to gear 11b, bevel gear 73b is freely rotatable on the shaft 70 and bevel gear 74b is driven by the engine 1a. In a similar fashion, engine 1c drives gear 11d through bevel gears 72d, 73d and 74d.

The only important differences from the two-engined power unit of Figures 1 and 2 is the omission of the two dog clutches and of one of the further bevel wheels associated with each primary epicyclic gear and of the auxiliary epicyclic gears. This means that the main engines 1a and 1c can drive the input gears 11b and 11d respectively through single-type variable filling fluid couplings 12a and 12c respectively. Additional unidirectional devices 76, 77 are provided, to prevent rotation in one direction of the input gears 11b and 11d respectively.

The operation of this four-engined unit is as follows:

Dual type fluid couplings associated with engines 1b and 1d are set to drive the first input gears 11b and 11d respectively of the primary epicyclic gears. The single-type fluid couplings are also filled. The engines 1a and 1b are then started. Both engines apply their full torque to the first input gear 11b. As indicated above the planet carrier 44b turns with double this torque which is applied to the input gear 66 of the secondary epicyclic gear 68 via bevel gears 34b and 36b; the input gear 67 is prevented from reverse rotation by the unidirectional devices 16b and 77 of the other two-engined unit, so that the planet carrier 69 of the secondary epicyclic gear 68 turns with double the torque applied to the input gear 66, namely four times the torque of two engines and this continues up to a speed of about 6 M. P. H.; this is represented by the part gh of the curve ghijkl of Figure 6. The next step is to start the engines 1c and 1d associated with the primary epicyclic gear 6d. This applies double the torque of engines 1c and 1d to the input gear 67 of the secondary epicyclic gear which was previously stationary. The planet carrier of the secondary epicyclic gear 68 now rotates at substantially the same speed as its input gears and delivers twice the torque of four engines at twice the speed previously given (assuming a substantially equal speed for all main engines). In other words full torque is maintained up to about 13 M. P. H. shown as i on the curve ghijkl.

From about 12 M. P. H. the torque drops uniformly until at 35 M. P. H., point j on the curve, it is about 44% of its original value. At higher speeds, the dual type fluid couplings associated with the engines 1b and 1d are set to drive only the input gears 15b and 15d, thereby causing all epicyclic gears to run as differential gears and the planet carrier of the secondary epicyclic gear to give double the previous speed and the torque of four engines. In this condition the power unit is running in the same way as the four-engined power unit described in U. S. patent specification No. 2,589,788 and the torque continues to fall uniformly, but less rapidly than formerly, until at 75 M. P. H. it is about 25% of its initial value; this is represented by the part j—k of the curve.

In this four-engined unit the additional unidirectional device 77 associated with the first input gear 11d of the primary epicyclic gear 6d performs an essential function when starting the power unit in the manner described above, since, in cooperation with the unidirectional device 16d, it prevents reverse rotation of the input gear 67 of the secondary epicyclic gear, as well as fulfilling the preferable, but not essential, function of avoiding interruption in the drive if the first main engine 1c fails when it alone is driving the first input gear of the primary epicyclic gear, as indicated above in connection with the two-engined power unit. The unidirectional devices 76 and 16b function in the same way to prevent reverse rotation of the gear 66, if starting is undertaken with engines 1c and 1d. The essential function just indicated could be fulfilled by a unidirectional device acting directly on each input gear of the secondary epicyclic gear, but a unidirectional gear so arranged would not permit either two-engined unit to drive without interruption if the first main engine failed. Hence the first described arrangement where the additional unidirectional gear fulfills the two functions, is preferred.

I claim:

1. A power unit comprising in combination first and second prime movers each having a torque/speed characteristic such that the torque falls steadily over the operating speed range, a primary epicyclic gear having first and second input gears, planet gear engaging said first and second input gears and a planet carrier, first transmission means including a variable filling fluid type coupling device for driving said first input gear by the first of said prime movers, second transmission means including a variable filling fluid type coupling device for selectively driving a selected one of said first and said second input gears by the second prime mover, a unidirectional device associated with said second input gear to prevent rotation thereof in one direction and means for transmitting power from the planet carrier.

2. A power unit as claimed in claim 1 in which torque multiplication means are included in said first transmission means.

3. A power unit comprising in combination first and second prime movers each having a torque/speed characteristic such that the torque falls steadily over the operating speed range, a primary epicyclic gear having first and second input gears, planet gears engaging said first and second input gears and a planet carrier, first transmission means including an auxiliary epicyclic gear having first and second input gears, planet gears engaging said first and second input gears, a unidirectional device associated with this second input gear to prevent rotation thereof in one direction and a planet carrier, means for transmitting power from the planet carrier of the auxiliary epicyclic gear to drive the first input gear of said primary epicyclic gear, and a variable-filling fluid type coupling device for selectively transmitting power from the first prime mover in one operative condition to drive the first input gear alone of said auxiliary epicyclic gear and in a second operative condition to drive both the first and the second input gears simultaneously of said auxiliary epicyclic gear, and second transmission means including a variable filling fluid type coupling device for selectively driving a selected one of the first and the second input gears of said primary epicyclic gear by the second prime mover, a unidirectional device associated with the second input gear of said primary epicyclic gear to prevent rotation thereof in one direction and means for transmitting power from the planet carrier of said primary epicyclic gear.

4. A power unit as claimed in claim 1 in which the first and second input gears of said primary epicyclic gear are arranged on a common axis and the means for transmitting power from the planet carrier of said primary epicyclic gear includes gears mounted on an axis at right angles to, and coplanar with, said common axis.

5. A power unit as claimed in claim 3 in which the said coupling devices and the first and second input gears of said primary epicyclic gear and the first and second input gears of said auxiliary epicyclic gear are arranged on a common axis and means for transmitting power from the planet carrier of said primary epicyclic gear includes gears mounted on an axis at right angles to, and coplanar with, said common axis.

6. A power unit as claimed in claim 3 having the first and second input gears of said primary epicyclic gear arranged on a first common axis, the first and second input gears of said auxiliary epicyclic gear arranged on a second common axis, said first and second common axes being parallel to each other, a gear train to connect the auxiliary epicyclic gear and the primary epicyclic gear, said gear train having the axes of all gears lying within the plane containing said first and second common axes and a gear for transmitting power from the planet carrier of the primary epicyclic gear, said power transmitting gear having its axis in the plane containing said first and second common axes.

7. A power unit as claimed in claim 3 in which unidirectional means are provided in association with the first input gear of said primary epicyclic gear to prevent rotation thereof in one direction.

8. A power unit as claimed in claim 3 in which rotation in one direction of the first input gear of said primary epicyclic gear is prevented by providing a unidirectional device acting upon said first as well as said second input gears of said auxiliary epicyclic gear.

9. A power unit as claimed in claim 1 in which the means for transmitting power from the planet carrier of the primary epicyclic gear comprises a bevel gear driven by the planet carrier and two further bevel gears engaging therewith and mounted freely upon a shaft having its axis at right angles to the axis of the input gears of the primary epicyclic gear, and two clutches whereby one or other of said further bevel gears may be fixed in relation to the shaft to provide a forward-reverse gear.

10. A power unit as claimed in claim 1 in which the fluid coupling included in said second transmission means is so controlled that said second prime mover can drive only the first input gear or second input gear of the primary epicyclic gear at one time.

11. A power unit which comprises two of the power units claimed in claim 1, a secondary epicyclic gear having first and second input gears, planet gears engaging these first and second input gears and a planet carrier, the planet carrier of each primary epicyclic gear being arranged to drive one input gear of a secondary epicyclic gear, and means for transmitting power from this planet carrier of said secondary epicyclic gear.

12. A power unit as claimed in claim 9, in which each of the power units as claimed in claim 1 has the fluid couplings and the first and second input gears of the primary epicyclic gear arranged on a common axis, a dual type fluid coupling included in the second transmission means, a single-type fluid coupling included in the first transmission means and a unidirectional device associated with the first input gear of the primary epicyclic gear to prevent rotation thereof in one direction.

References Cited in the file of this patent

UNITED STATES PATENTS

| 1,966,952 | Kimpton | July 17, 1934 |
| 2,417,198 | Hindmarch | Mar. 11, 1947 |
| 2,610,526 | Fell et al. | Sept. 16, 1952 |
| 2,619,800 | Fell | Dec. 2, 1952 |
| 2,638,798 | Yingling | May 19, 1953 |